US010013306B2

(12) United States Patent
Umbehocker et al.

(10) Patent No.: US 10,013,306 B2
(45) Date of Patent: Jul. 3, 2018

(54) DATA RECOVERY AGENT AND SEARCH SERVICE FOR REPAIRING BIT ROT

(71) Applicant: OSNEXUS Corporation, Bellevue, WA (US)

(72) Inventors: Steven Michael Umbehocker, Mercer Island, WA (US); Allen Petersen, Bellingham, WA (US); Chunwei Chen, Mercer Island, WA (US)

(73) Assignee: OSNEXUS CORPORATION, Bellevue, WA (US)

( * ) Notice: Subject to any disclaimer, the term of this patent is extended or adjusted under 35 U.S.C. 154(b) by 127 days.

(21) Appl. No.: 15/073,982

(22) Filed: Mar. 18, 2016

(65) Prior Publication Data

US 2016/0274967 A1    Sep. 22, 2016

Related U.S. Application Data

(60) Provisional application No. 62/134,958, filed on Mar. 18, 2015.

(51) Int. Cl.
| | | |
|---|---|---|
| *G06F 11/00* | (2006.01) | |
| *G06F 11/10* | (2006.01) | |
| *G06F 11/14* | (2006.01) | |
| *G06F 11/07* | (2006.01) | |

(52) U.S. Cl.
CPC ...... *G06F 11/1004* (2013.01); *G06F 11/0703* (2013.01); *G06F 11/1458* (2013.01); *G06F 11/1469* (2013.01); *G06F 11/1451* (2013.01); *G06F 2201/84* (2013.01)

(58) Field of Classification Search
CPC ............. G06F 11/0772; G06F 11/1004; G06F 11/1458; G06F 11/1469
See application file for complete search history.

(56) References Cited

U.S. PATENT DOCUMENTS

| 6,865,655 | B1 * | 3/2005 | Andersen | G06F 11/1453 707/999.202 |
|---|---|---|---|---|
| 7,526,622 | B1 * | 4/2009 | Bonwick | G06F 3/061 711/161 |
| 7,694,191 | B1 * | 4/2010 | Bono | G06F 11/004 714/48 |
| 2013/0275695 | A1 * | 10/2013 | Ponsford | G06F 11/1448 711/162 |

(Continued)

*Primary Examiner* — Marc Duncan
(74) *Attorney, Agent, or Firm* — Amin, Turocy & Watson, LLP

(57) ABSTRACT

A data recovery agent and search service for repairing bit rot are presented herein. The data recovery agent can receive error event notifications representing respective file system errors. Based on a checksum error corresponding to such notifications, the data recovery agent can determine that a portion of a file has been invalidated or corrupted, obtain checksum information comprising a checksum of a validated version of the portion and location information comprising an offset from a beginning of the file representing a location of the portion, and send such information to a server hosting a data recovery service being configured to obtain a copy of a validated version of the portion from backup storage device(s). Further, the data recovery agent can receive the copy of the validated version from the server, and repair, using the copy, the portion that has been invalidated or corrupted.

25 Claims, 10 Drawing Sheets

(56) References Cited

U.S. PATENT DOCUMENTS

2014/0181575 A1* 6/2014 Kalach ................ G06F 11/1415
  714/6.11
2016/0203058 A1* 7/2016 Chavda ............... G06F 11/1453
  707/686
2017/0060698 A1* 3/2017 Noe .................... G06F 11/1469

* cited by examiner

DATA RECOVERY AGENT AND SEARCH SERVICE FOR REPAIRING BIT ROT

PRIORITY CLAIM

This application claims priority to U.S. Provisional Patent Application Ser. No. 62/134,958, filed on Mar. 18, 2015, entitled "FILE SYSTEM DATA RECOVERY", the entirety of which is incorporated by reference herein.

TECHNICAL FIELD

This disclosure relates generally to file system data recovery, but not limited to, a data recovery agent and search service for repairing bit rot.

BACKGROUND

Large capacity storage media (including solid state, magnetic, optical and other mediums) have a higher probability of suffering from data degradation or "bit rot" as the amount of data stored in such media increases. To protect against bit rot, conventional file systems use a checksum of the data to detect whether it has been corrupted, i.e., due to the decay of media. Further, such file systems maintain copies of the data and/or parity information so that a corrupted region of the data can be repaired. Due to cost and efficiency concerns, some conventional file systems only store a single copy of data within a storage media. In this regard, although a checksum and parity information can be used to confirm whether bit rot has occurred in a storage medium, a backup copy of the data is not stored "locally" within such medium. Consequently, conventional file system technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
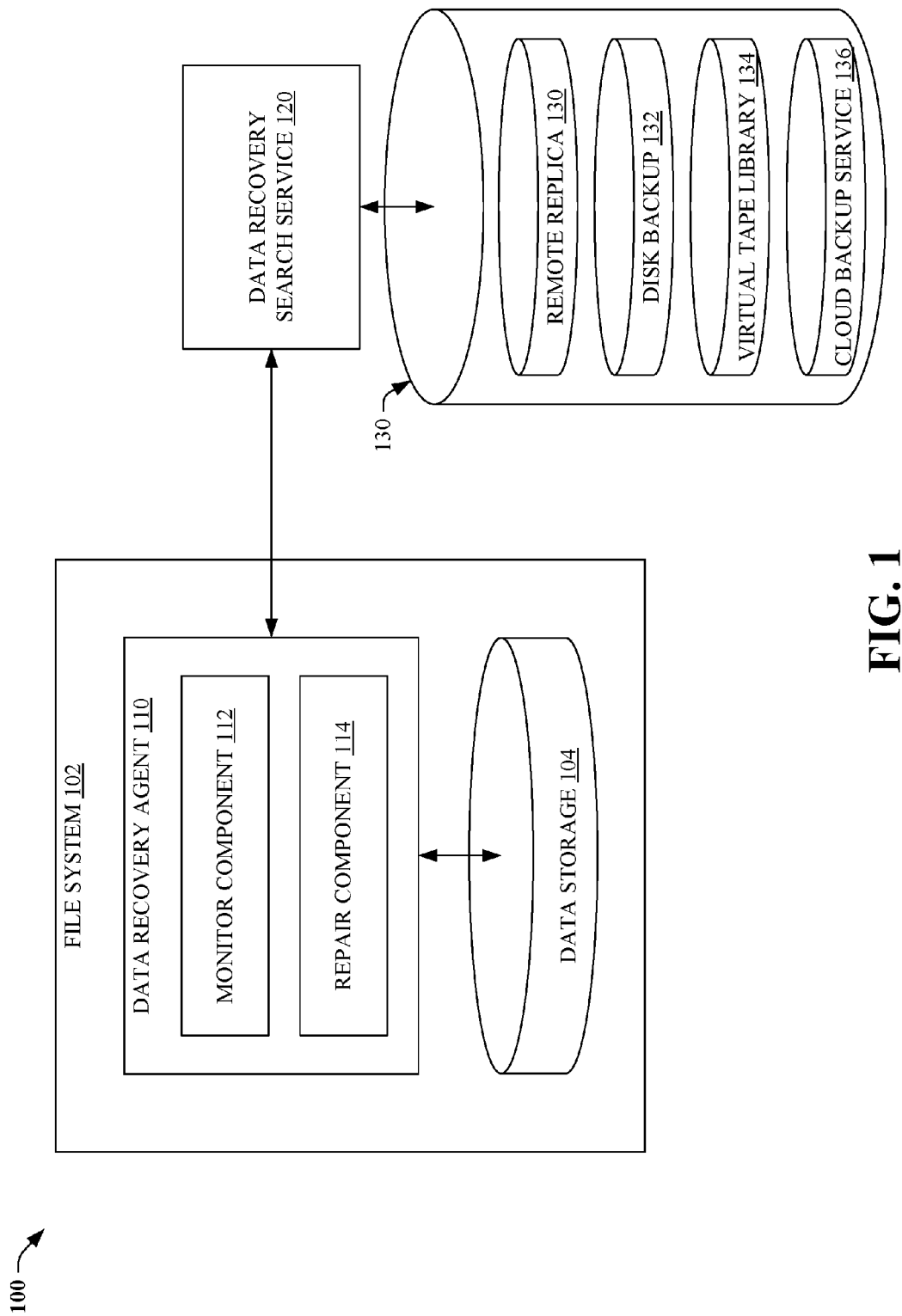
FIG. 1 illustrates a block diagram of a data recovery file system environment, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional file system technologies suffer from bit rot, e.g., data degradation of storage media. However, due to cost and/or efficiency reasons, one or more backup copies of data of a file system are stored outside of the file system. Various embodiments can improve file system performance and integrity by monitoring for file system error events associated with bit rot and dynamically repairing data blocks associated with such failures.

For example, a file system can comprise a data recovery agent for "surgically" identifying and repairing damaged data block(s) of a file. The data recovery agent can comprise a monitor component that can receive, monitor, etc. event notifications representing respective file system errors. In this regard, in one embodiment, a callback function, e.g., a system call that has been executed via an application programming interface (API), can be registered with the file system to receive the event notification(s) representing respective file system errors, e.g., corresponding to attempted access of a file or virtual block device. In another embodiment, the monitor component can produce the event notification(s) in response to monitoring, querying, etc. an event log of the file system—the event log recording result(s) of the attempted access of the file or virtual block device.

The monitor component can further determine, based on the event notification(s), whether a portion, e.g., at least one data block, of the file or virtual block device has been corrupted and/or invalidated, e.g., based on checksum error(s) of the portion being determined to satisfy a defined criterion for bit-rot, e.g., the checksum error(s) representing that evaluated checksum(s) of the portion do not match previously computed, stored, etc. checksum(s) of an uncorrupted version of the portion.

Further, in response determining that the portion has been corrupted or invalidated due to bit-rot, monitor component can obtain, e.g., via API call(s) using an information component, checksum information and location information for the portion—the checksum information comprising a checksum of the uncorrupted version of the portion, information representing a checksum algorithm, process, etc. that was used to generate the checksum; and the location information comprising an offset from a beginning of the file or the virtual block device representing a location of the portion, a block size of the portion, a file location of the file or a path location of the virtual block device, a file name of the file, a file length of the file, a file system identifier of the file system, etc.

In this regard, a repair component of the data recovery agent can send a request comprising the checksum information and the location information to a data recovery search service, which can obtain, based on such information, a copy of the uncorrupted version of the portion from one or more backup storage devices that have stored respective copies of the file or the virtual block device.

In an embodiment, a security component of the data recovery agent can authorize sending of the request to the data recovery search service based on security information comprising a host identification of the file system and/or based on user information representing an identity of a user that has been authorized to access the file system, e.g., to prevent unauthorized repair of data block(s) of the file system.

In response to repair component receiving, based on the request, the copy of the uncorrupted version from the data recovery search service, the repair component can repair, using the copy, the portion that has been corrupted or invalidated due to bit-rot. In this regard, in one embodiment, the repair component can repair the portion by writing, using a system call, the copy to the portion. In another embodiment, the repair component can repair the portion by directly writing, using a block device operation performed on a disk block of the file system, the copy to the portion.

In another embodiment, the repair component can comprise a checksum component that can determine, based on the checksum algorithm, process, etc. that was used to generate the checksum, a determined checksum of the copy that has been received from the data recovery search service. Further, the checksum component can repair the portion in response to determining that the determined checksum matches the checksum.

In one embodiment, the data recovery search service can be communicatively coupled to the file system via an out-of-band network interface, e.g., Internet, etc. In another embodiment, one or more components of the file system can comprise the data recovery search service, and communicate with the data recovery agent via API(s), etc.

In yet another embodiment, a method can comprise receiving, by a file system comprising a processor, error event notifications representing respective file system errors. In an embodiment, the receiving can comprise registering a callback function with the file system for generating the error event notifications. In another embodiment, the receiving can comprise monitoring, periodically monitoring, etc. an event log of the file system for checksum errors, and generating the error event notifications based on the monitoring.

Further, in response to determining, based on checksum error(s) corresponding to the error event notifications, that a portion of a file or a virtual block device has been invalidated and/or corrupted, the method can comprise obtaining, by the file system, e.g., using API(s), checksum information and location information. In this regard, the checksum information can comprise a checksum of an uncorrupted, validated, etc. version of the portion and information representing a checksum algorithm that was used to generate the checksum. Furthermore, the location information can comprise an offset from a beginning of the file or the virtual block device representing a location of the portion, a block size of the portion, a file location of the file or a path location of the virtual block device, a file name of the file, a file length of the file, and a file system identifier of the file system.

The method can further comprise sending, by the file system, the checksum information and the location information to a server hosting a data recovery search service in order to obtain a copy of the uncorrupted, validated, etc. version—the data recovery search service being configured to obtain, based on the checksum information and the location information, the copy of the uncorrupted, validated, etc. version of the portion from backup storage device(s) that have stored respective copies of the file or the virtual block device. In an embodiment, the method can send the checksum information and the location information to the server in response to determining, based on security information, that sending such information has been authorized.

Further, in response to receiving the copy of the uncorrupted, validated, etc. version from the data recovery search service, the method can comprise repairing, by the file system using the copy, the portion that has been invalidated and/or corrupted. In one embodiment, the repairing can comprise writing, via a system call, the copy of the validated version to the portion that has been invalidated and/or corrupted. In another embodiment, the repairing can comprise writing, using a block device operation performed on a disk block of the file system, the copy of validated version to the portion that has been invalidated and/or corrupted.

In yet another embodiment, a system comprising a data recovery search service can receive, from a data recovery agent device, file system, etc. a query for obtaining a copy of an uncorrupted portion of a file or a virtual block device—the query comprising checksum information comprising a checksum of the uncorrupted portion, information representing a checksum algorithm, process, etc. that was used to generate the checksum, and location information comprising an offset from a beginning of the file or the virtual block device representing a location of the uncorrupted portion, a block size of the uncorrupted portion, a file location of the file or a path location of the virtual block device, a file name of the file, a file length of the file, and a file system identifier of the file system.

Further, the system, via the data recovery search service, can use component(s) of a group of software plug-ins, plug-in components, etc., which have been registered with the data recovery search service for communicating with respective backup storage devices, to obtain, based on the checksum information and the location information, a copy of the uncorrupted portion from a backup storage device of the respective backup storage devices.

In one embodiment, the system can receive authorization information, e.g., comprising an Internet protocol address of the backup storage device, a username identity corresponding to the backup storage device, and/or a password corresponding to the username identity, for accessing the backup storage device; and based on the authorization information, obtain, via the component(s) of the group of software plug-ins, plug-in components, etc., the copy of the uncorrupted portion from the backup storage device.

In another embodiment, the system can retrieve, via the component(s) of the group of software plug-ins, plug-in components, etc., a file copy of the file from the backup storage device, and extract the copy of the uncorrupted portion from a portion of the file copy. In other embodiment(s), the system can retrieve, via the component(s), a retrieved portion of the file or the virtual block device from a remote-replica of a file system or a cloud backup of the file system, and extract the copy of the uncorrupted portion from the retrieved portion.

Furthermore, in satisfaction of the query, the system can send the copy of the uncorrupted portion to the data recovery agent device, file system, etc. In an embodiment, the system can determine a computed checksum on the copy of the uncorrupted portion, and send the copy of the uncorrupted portion to the data recovery agent device, file system, etc. in response to verifying that the computed checksum matches the checksum.

In an embodiment, a machine-readable storage medium can comprise executable instructions that, when executed by a processor, facilitate performance of operations, comprising: in response to receiving, from a data recovery system, a request to obtain a copy of an uncorrupted portion of a file or a virtual block device, obtaining, via software plug-ins corresponding to respective backup storage devices, the copy from a backup storage device of the respective backup storage devices—the request comprising a checksum of the uncorrupted portion of the file or the virtual block device and location information comprising an offset from a beginning of the file or the virtual block device representing a location of the uncorrupted portion, a block size of the uncorrupted portion, a file location of the file or a path location of the virtual block device, a file name of the file, a file length of the file, and a file system identifier of the data recovery system. Further, the operations can comprise sending the copy directed to the data recovery system.

In one embodiment, the obtaining comprises iteratively sending, via the software plug-ins, respective queries comprising the checksum and/or the location information directed to the respective backup storage devices, and based on a query of the respective queries, receiving the copy from the backup storage device.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via data recovery agent 110 (see below), to determine, based on reported file system errors associated with checksum errors, that a portion of a file or a virtual block device has been corrupted and/or invalidated due to bit-rot.

A classifier can be a function that maps an input attribute vector, $x=(x1, x2, x3, x4, xn)$, to a confidence that the input belongs to a class, that is, $f(x)=confidence (class)$. Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of event notifications reported by a file system, e.g., corresponding to checksum error(s), receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by data recovery agent 110 (see below), data recovery search service 120 (see below), etc.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Referring now to FIG. 1, a block diagram of a data recovery file system environment 100 is illustrated, in accordance with various embodiments. Data recovery file system environment 100 comprises file system 102 that can access, e.g., during software execution, data stored in data storage 104. In embodiment(s), data storage 104 can comprise a block storage device, a virtual block storage device, a "just a bunch of disks" (JBOD) storage device, a redundant array of inexpensive disks (RAID) "bunch of disks" (RBOD) storage device, a virtual storage appliance, etc. Further, data storage 104 can comprise: Small Computer System Interface (SCSI) storage devices, which are based on a peripheral, peer-to-peer interface that can be used, e.g., in personal computer (PC) server systems; Serial Advanced Technology Attachment (SATA) storage devices; SCSI-over-Fiber Channel storage devices; SAS devices; Internet SCSI (iSCSI) devices, which are associated with an Internet Protocol (IP) based storage networking standard for linking data storage facilities and/or entities; Advanced Technology (AT) Attachment (ATA) storage devices; ATA over Ethernet (AoE) storage devices; other Storage Area Network (SAN) devices, etc.

As described above, as a storage capacity of a storage media, e.g., data storage 104, increases, the storage media can be associated with a higher probability of bit rot. Various embodiments disclosed herein can dynamically attempt to repair corrupted, damaged, invalidated, etc. data block(s) of a file associated with bit rot by (1) detecting reported file data access error(s) and (2) "surgically" repairing corrupted, damaged, invalidated, etc. portion(s) of the file corresponding to the data access error(s).

In this regard, file system 102 can comprise data recovery agent 110, e.g., an application, a software application, etc. that can comprise monitor component 112 and repair component 114. Monitor component 112 can receive, monitor, etc. event notifications representing respective file system errors that have occurred in file system 102. In this regard, in one embodiment, a callback function, e.g., a system call that has been executed via an API, can be registered, via monitor component 112, with file system 102 to receive the event notification(s), e.g., corresponding to an attempted access, read, etc. of a file or virtual block device stored in data storage 104. In another embodiment, monitor component 112 can produce the event notification(s) in response to monitoring, querying, polling, etc. an event log (not shown) of file system 102—the event log at least recording result(s), error(s), etc. of attempted access, e.g., by applications executing on file system 102, of data block(s) of the file or virtual block device.

Further, monitor component 112 can determine, based on the event notification(s), whether a portion, e.g., data block(s), of the file or virtual block device has been corrupted and/or invalidated, e.g., based on checksum error(s) of the portion being determined to satisfy a defined criterion for bit-rot, e.g., the checksum error(s) indicating that previously computed, stored, etc. checksum(s) of an uncorrupted version of the portion do not match determined checksum(s) of the portion.

Figure 3:
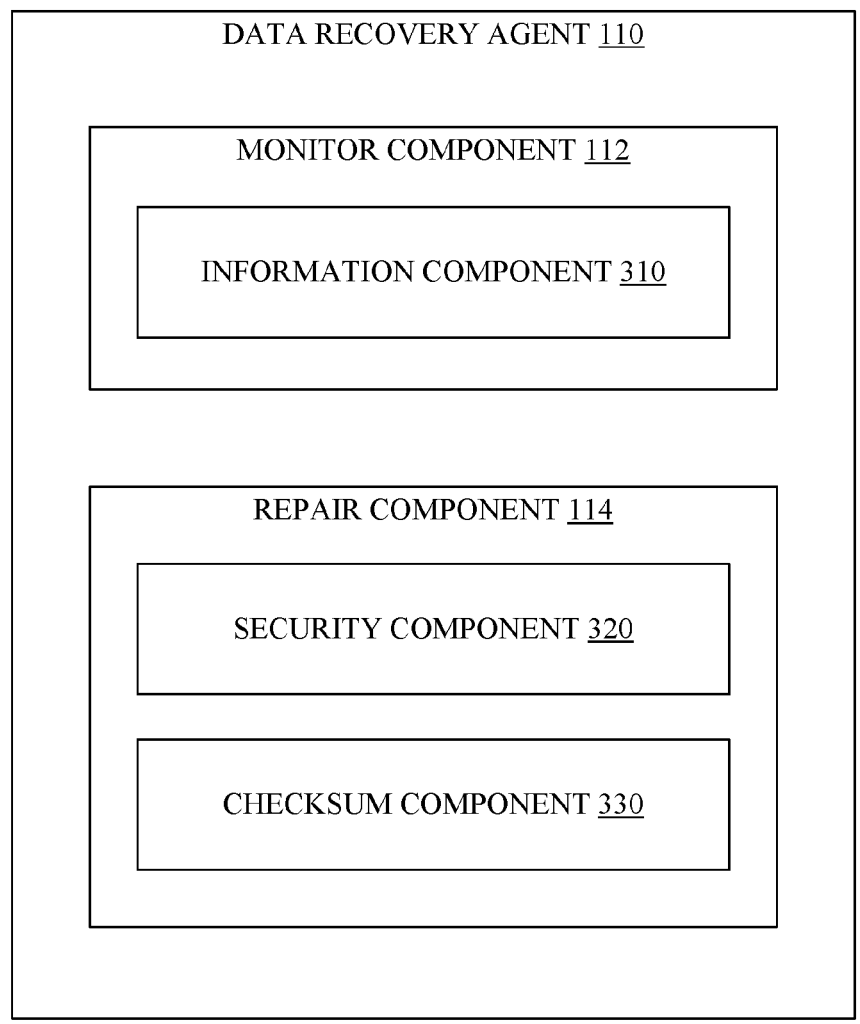
FIG. 3 illustrates a block diagram of another data recovery agent, in accordance with various embodiments.

Now referring to an embodiment illustrated by FIG. 3, monitor component 112 can comprise information component 310 that can be configured to determine whether an event notification of the event notification(s) corresponds to a checksum error, and obtain, e.g., via an API, a system call, etc. checksum information and location information for the portion that has been corrupted and/or invalidated—the checksum information comprising a checksum of the uncorrupted version of the portion, information representing a checksum algorithm, process, etc. that was used to generate the checksum, e.g., a hash algorithm, a message digest algorithm, a secure hash algorithm (SHA), and/or a message-digest algorithm 5 (MD5) algorithm, etc.

Further, the location information can comprise an offset from a beginning of the file or the virtual block device representing a location of the portion, a block size of the portion, a file location of the file or a path location of the virtual block device, a file name of the file, a file length of the file, an a file system identifier of file system 102.

Repair component 114 can be configured to send a request comprising the checksum information and the location information to data recovery search service 120, which can obtain, based on such information, a copy of the uncorrupted version of the portion from backup storage devices 130 that have stored respective copies of the file or the virtual block device.

In an embodiment, security component 320 can authorize sending of the request to data recovery search service 120 based on security information, e.g., comprising a host identification of file system 102, user information representing an identity of a user that has been authorized to access file system 102, etc., for example, to prevent unauthorized repair of data block(s) of data storage 104.

Figure 4:
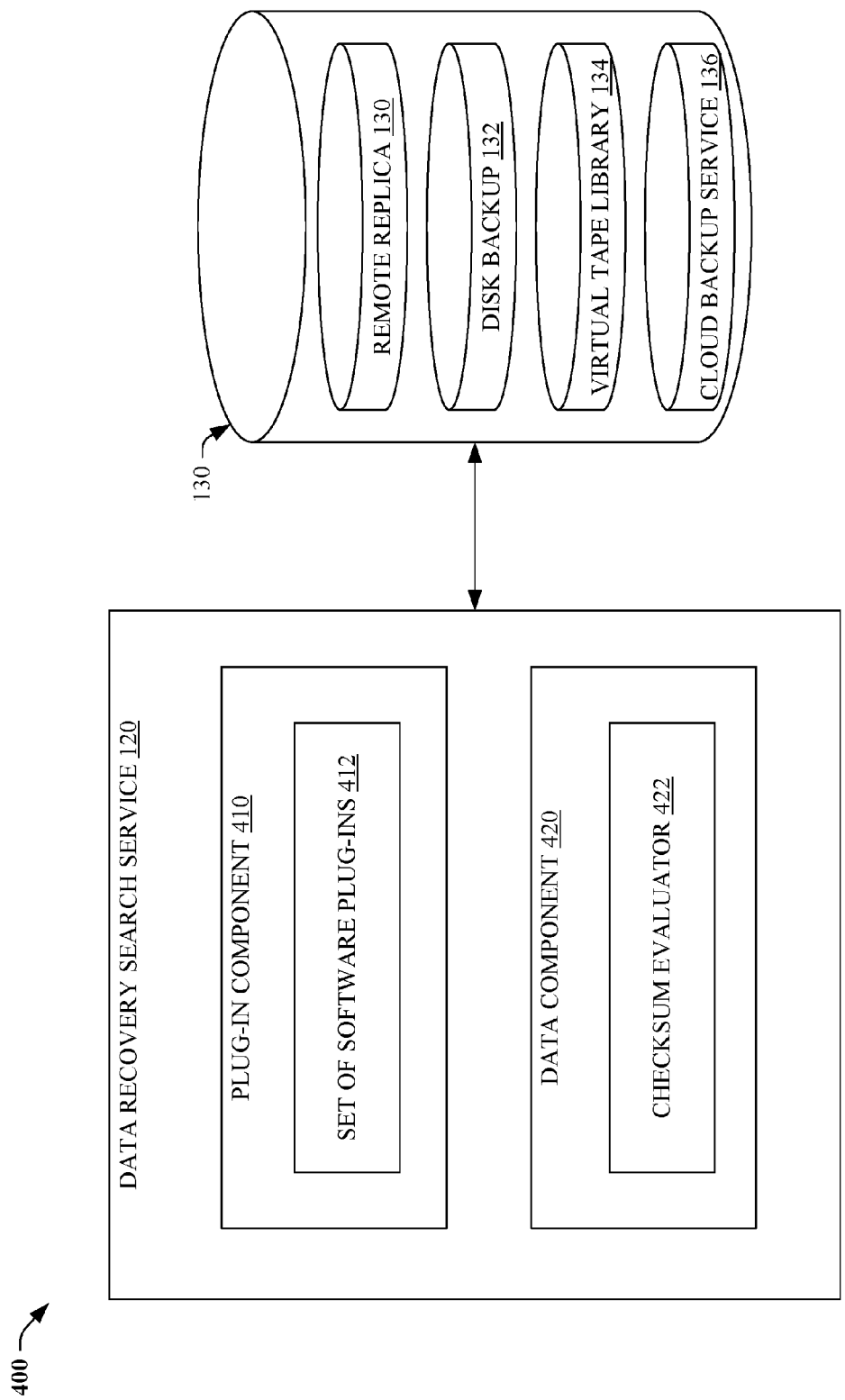
FIG. 4 illustrates a block diagram of a data recovery search service, in accordance with various embodiments.

Referring now to an embodiment illustrated by FIG. 4, data recovery search service 120 can receive, from data recovery agent 110, the request, e.g., comprising a query for obtaining a copy of the uncorrupted version of the portion of the file or virtual block device—the query comprising the checksum information and the location information. Further, data recovery search service 120 can use set of software plug-ins 412, e.g., a group of software plug-ins, plug-in components, etc. of plug-in component 410 that have been registered with data recovery search service 120 for communicating with respective backup storage devices of backup storage devices 130, to obtain, based on the checksum information and the location information, a copy of the uncorrupted portion from a backup storage device of the respective backup storage devices.

In an embodiment, data recovery search service 120 can iteratively send, via set of software plug-ins 412, respective queries comprising the checksum and the location information directed to the respective backup storage devices, and based on a query of the respective queries, receiving the copy from the backup storage device.

As illustrated by FIG. 4, backup storage devices 130 can comprise remote-replica 130, e.g., a remote replication of file system 102, disk backup 132, e.g., a disk backup of data storage 104, virtual tape library (VTL) 134, e.g., comprising a virtual tape backup of file system 102, and cloud backup service 136, e.g., a cloud-based backup of data storage 104.

In one embodiment, backup storage devices 130 can comprise vendor specific file systems, storage platforms, products, etc. In this regard, plug-in component 410 can act as a translator of requests received from data recovery agent 110. For example, plug-in component 410 can translate a request for obtaining a copy of the uncorrupted version of the portion of the file or virtual block to conform to specific APIs that can be used to communicate with, access, etc. the vendor specific file systems, storage platforms, products, etc.

Figure 5:
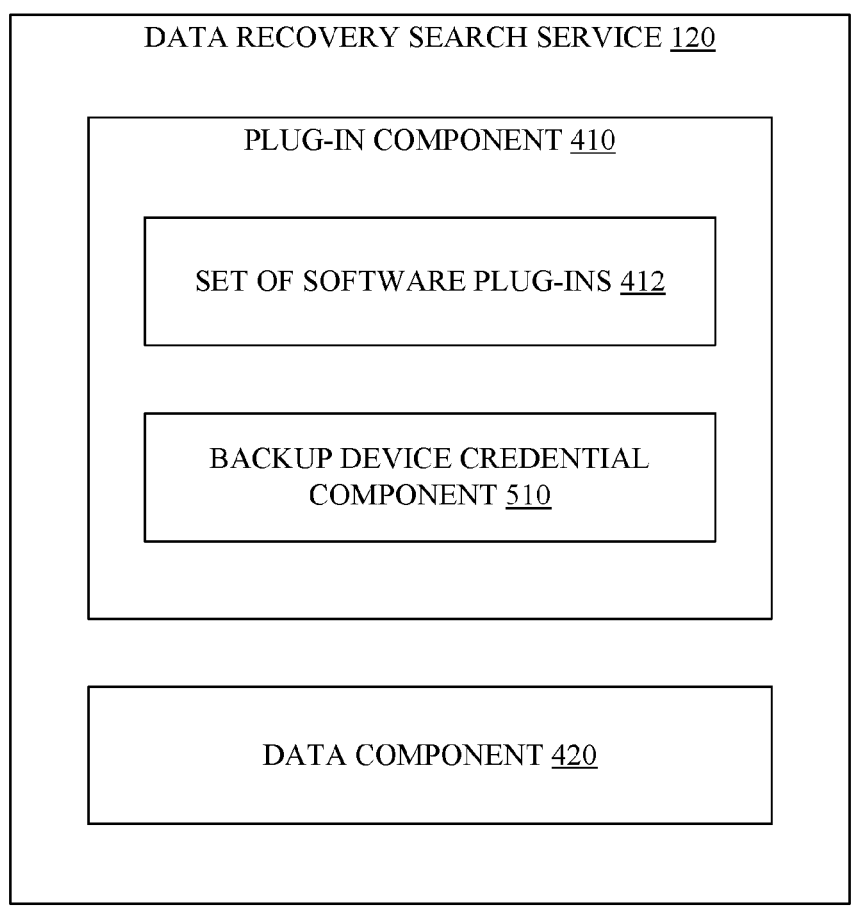
FIG. 5 illustrates a block diagram of another data recovery search service, in accordance with various embodiments.

In another embodiment illustrate by FIG. 5, backup device credential component 510 can receive, e.g., via a user interface (not shown), administration credentials, authorization information, e.g., comprising an Internet protocol address of the backup storage device, a username identity corresponding to the backup storage device, a password corresponding to the username identity, etc. for accessing the backup storage device. In this regard, and now returning to FIG. 4, data component 420 can obtain, retrieve, etc., based on the authorization information via plug-in component 410, the copy of the uncorrupted portion from the backup storage device.

In yet another embodiment, data component 420 can obtain, retrieve, etc., based on the authorization information via plug-in component 410, a file copy of the file from the backup storage device, and extract the copy of the uncorrupted portion from a portion of the file copy.

Further, in satisfaction of the query, data component 420 can send the copy of the uncorrupted portion to data recovery agent 110. In an embodiment, checksum evaluator 422 of data recovery search service 120 can determine a computed checksum on the copy of the uncorrupted portion, and data component 420 can send the copy of the uncorrupted portion to data recovery agent 110 in response to checksum evaluator 422 determining that the computed checksum matches the checksum.

Returning now to FIG. 3, repair component 114 of data recovery agent 110 can receive the copy of the uncorrupted portion from data recovery search service 120, and repair, using the copy, the portion that has been corrupted or invalidated due to bit-rot. In this regard, in one embodiment, repair component 114 can repair the portion by writing, using a system call, the copy to the portion. In another embodiment, repair component 114 can repair the portion by directly writing, using a block device operation performed on a disk block of file system 102, the copy to the portion.

In another embodiment, repair component can comprise checksum component 330 that can determine, based on the checksum algorithm, process, etc. that was used to generate the checksum, a determined checksum of the copy that has been received from data recovery search service 120. Further, in response to checksum component 330 determining that the determined checksum matches the checksum, checksum component can repair the portion as described above.

Figure 2:
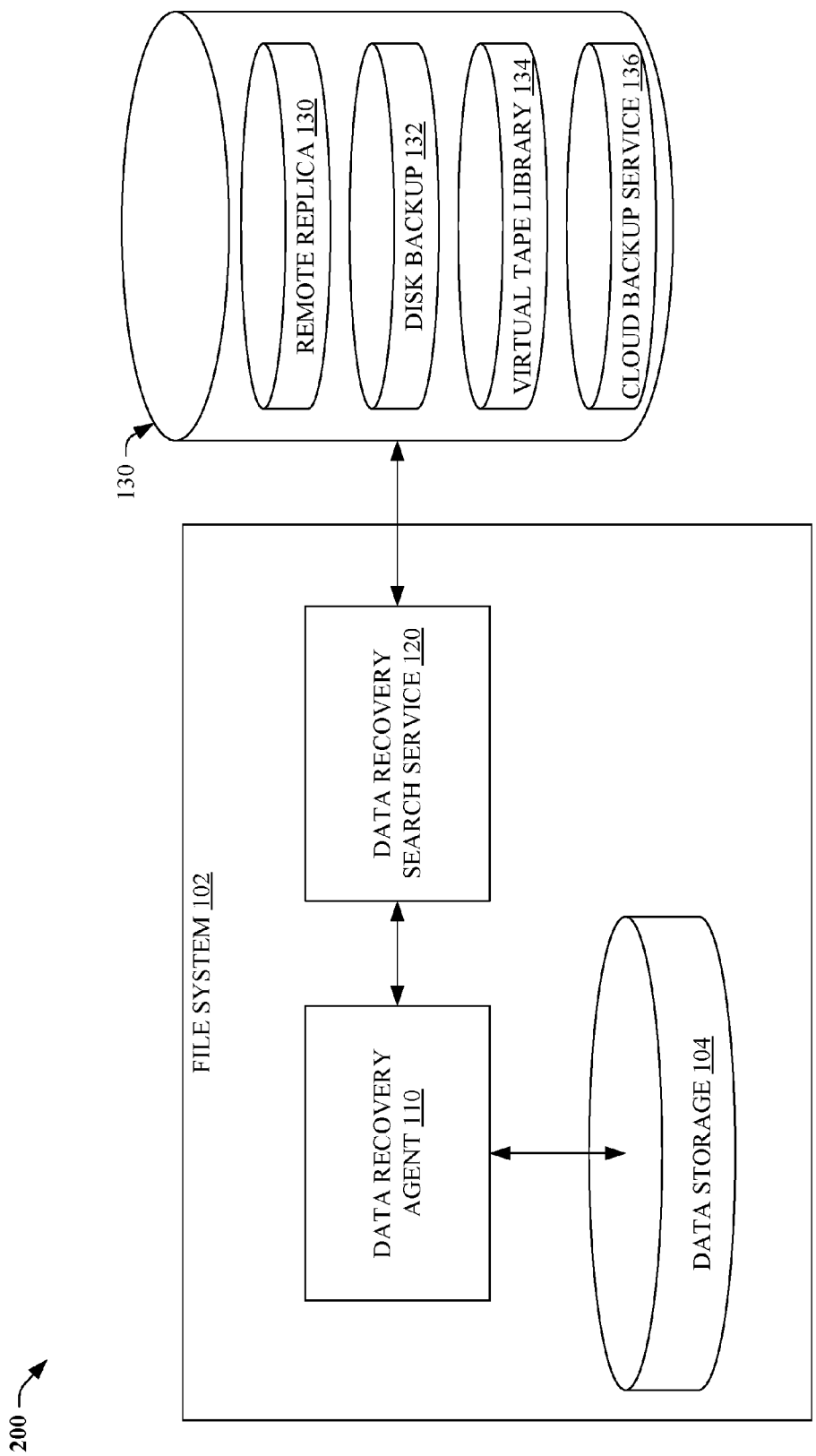
FIG. 2 illustrates a block diagram of a file system comprising a data recovery agent and a data recovery search service, in accordance with various embodiments.

In one embodiment, as illustrated by FIG. 1, data recovery search service 120 can be communicatively coupled to file system 102 via an out-of-band, e.g., network, interface, e.g., Internet. In another embodiment, as illustrated by FIG. 2, file system 120 can comprise data recovery search service 120, and data recovery agent 110 can communicate with data recovery search service 120 via API(s), etc.

FIGS. 6-9 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
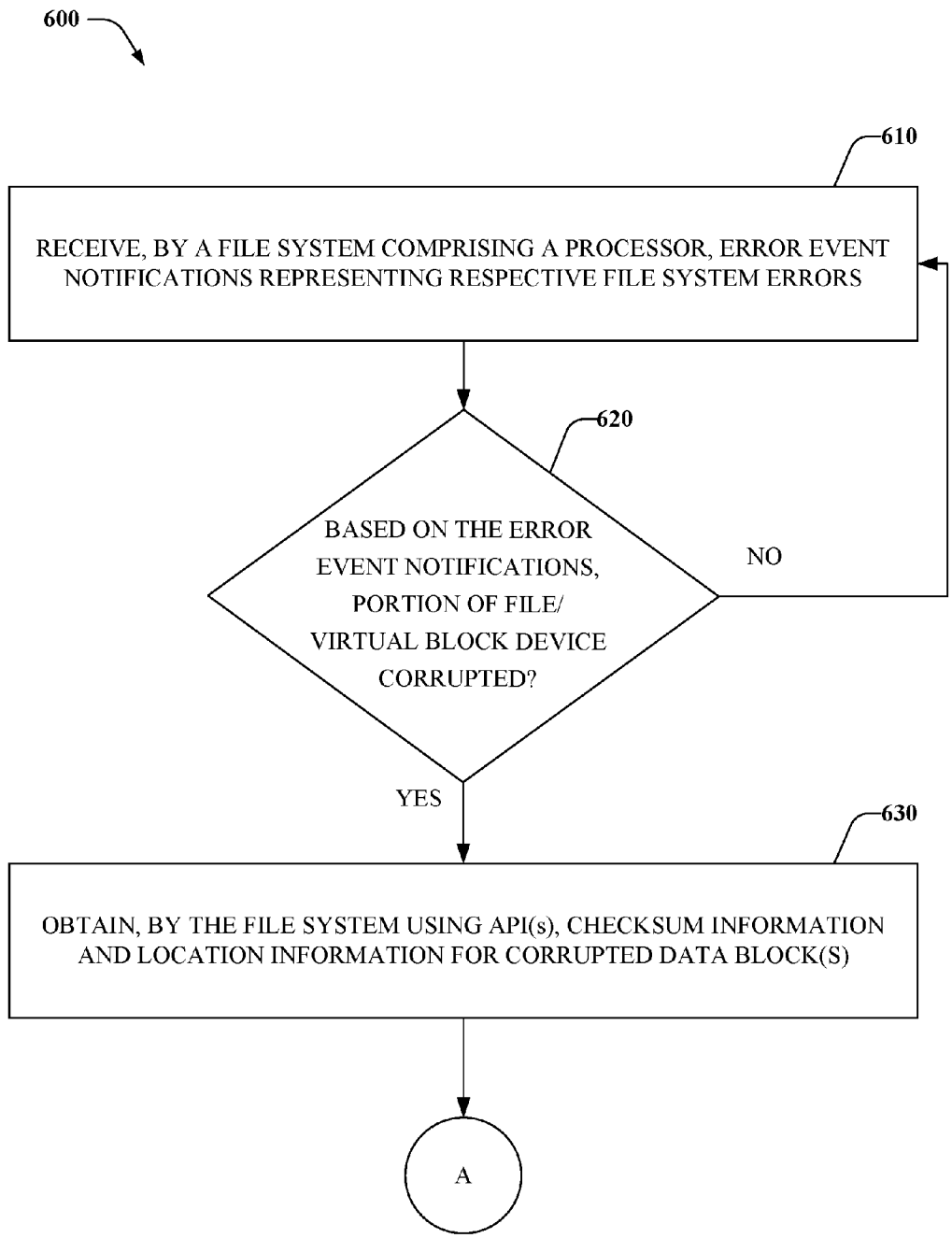
FIGS. 6-8 illustrate flow diagrams of methods associated with a data recovery agent, in accordance with various embodiments.
Figure 7:
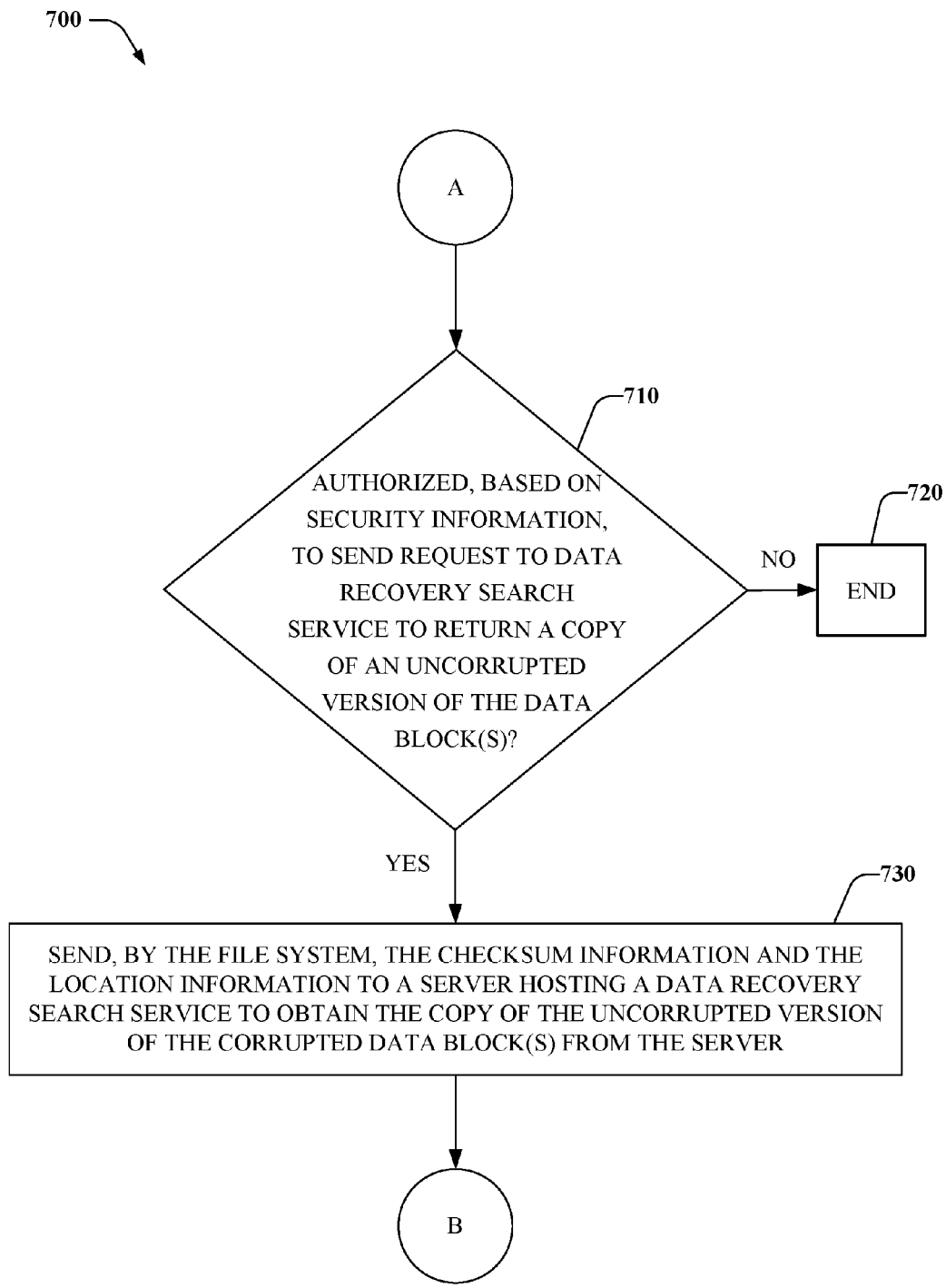
Figure 8:
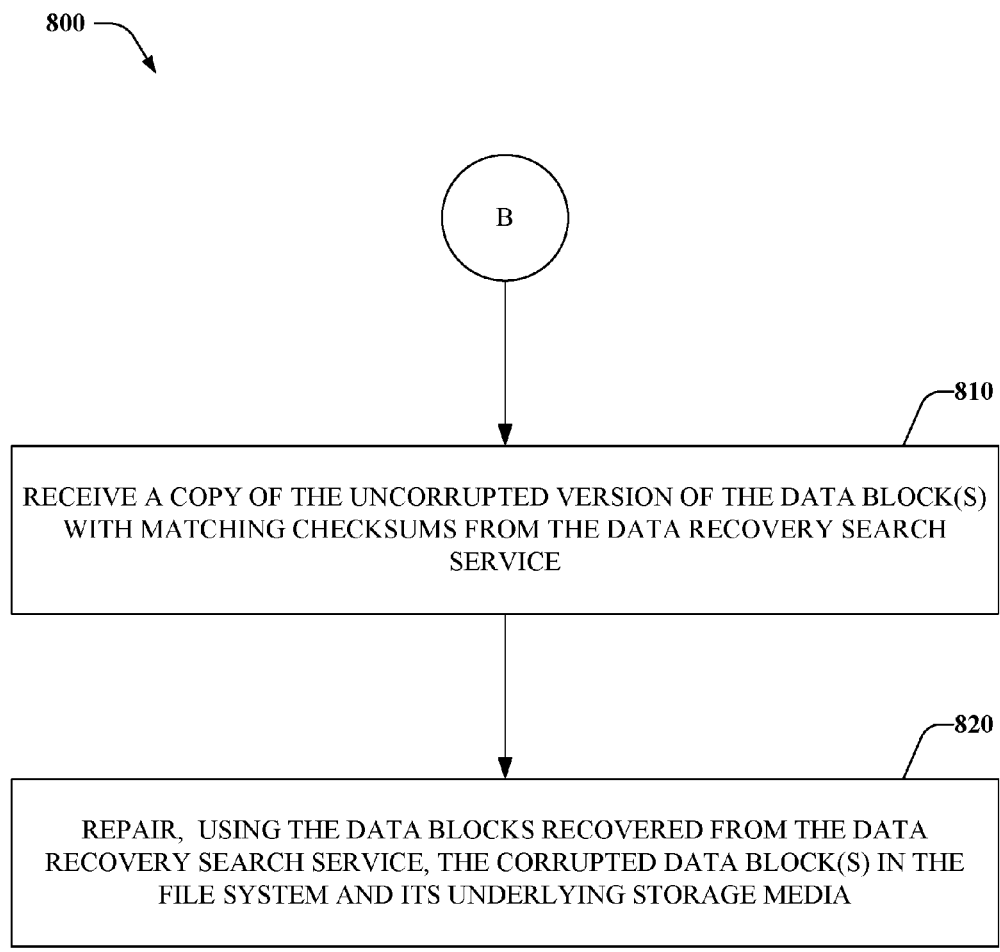

Referring now to FIGS. 6-8, processes (600-800) associated with a data recovery agent, e.g., 110, are illustrated, in accordance with various embodiments. At 610, error event notifications representing respective file system errors can be received. At 620, it can be determined, based on the error event notifications, whether a portion, data block(s), etc. of a file or virtual block device are corrupted, e.g., based on computed checksums corresponding to the portion, data block(s), etc. In response to determining that the portion, data block(s), etc. of the file or virtual block device are corrupted, flow continues to 630; otherwise flow returns to 610.

At 630, checksum information and location information for the portion of corrupted data block(s) can be obtained, using API(s). Flow continues from 630 to 710, at which it can be determined, based on security information, whether sending of a request for a data recovery search service to return a copy of an uncorrupted version of the data block(s) has been authorized. In response to determining that the request has been authorized, flow continues to 730; otherwise flow ends at 720.

At 730, the checksum information and the location information can be sent to a server hosting the data recovery search service to obtain the copy of the uncorrupted version of the data block(s) from the server. Flow continues from 730 to 810, at which the copy of the uncorrupted version of the data block(s), with matching checksums, e.g., checksum(s) matching respective checksum(s) of the uncorrupted version of the data block(s), can be received from the data recovery search service. At 820, the corrupted data block(s), e.g., in the file system and its underlying storage media, can be repaired using the copy of the uncorrupted version of the data block(s), e.g., recovered from the data recovery search service.

Figure 9:
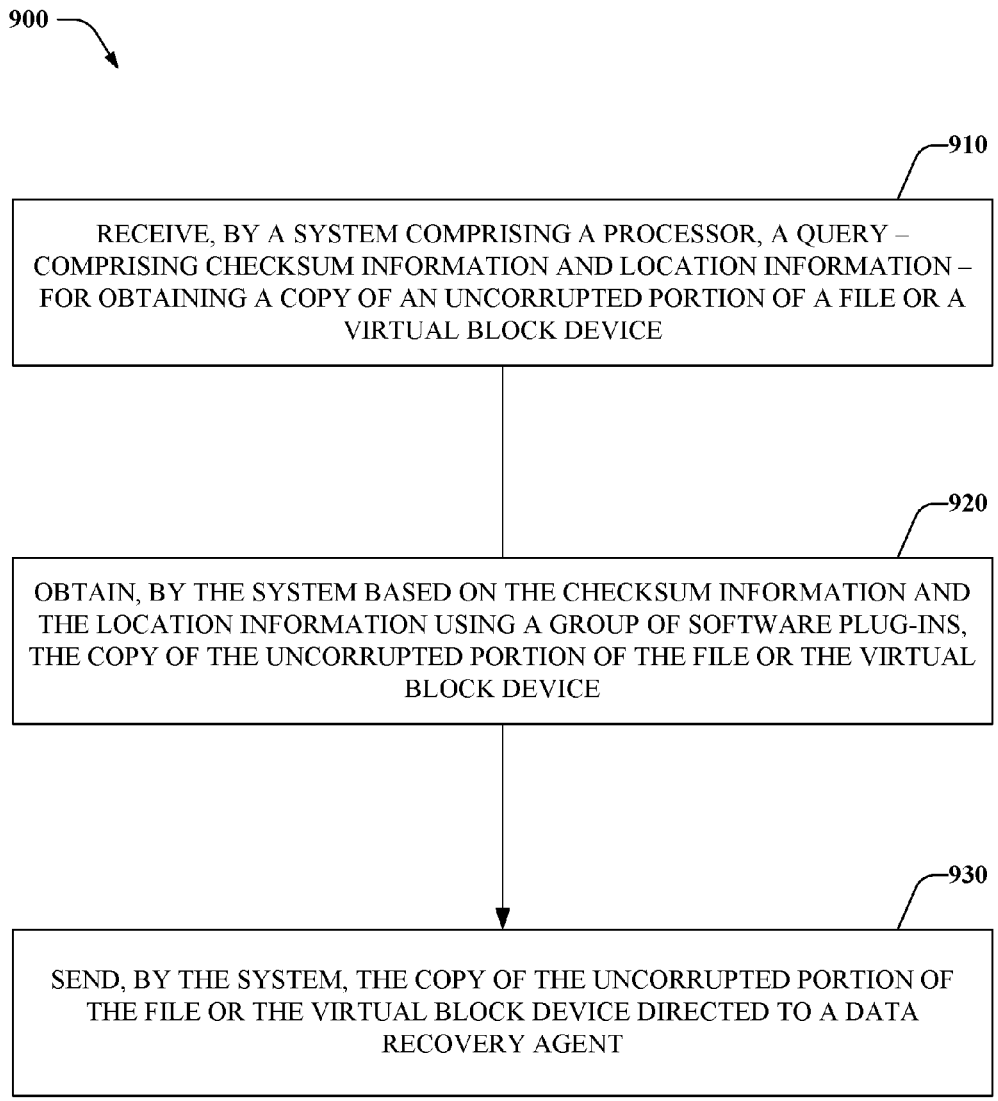
FIG. 9 illustrates a flow diagram of a method associated with a data recovery search service, in accordance with various embodiments.

FIG. 9 illustrates a process (900) associated with a data recovery search service, e.g., 120, in accordance with an embodiment. At 910, a query—comprising checksum information and location information—for obtaining a copy of an uncorrupted portion of a file or a virtual block device can be received. At 920, based on the checksum information and the location information, the copy of the uncorrupted portion of the file or the virtual block device can be obtained using a group of software plug-ins, e.g., corresponding to respective backup storage devices. At 930, the copy of the uncorrupted portion of the file or the virtual block device can be sent to a data recovery agent, e.g., 110.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "storage media," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in data storage 104, backup storage devices 130, non-volatile memory 1022 (see below), disk storage 1024 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
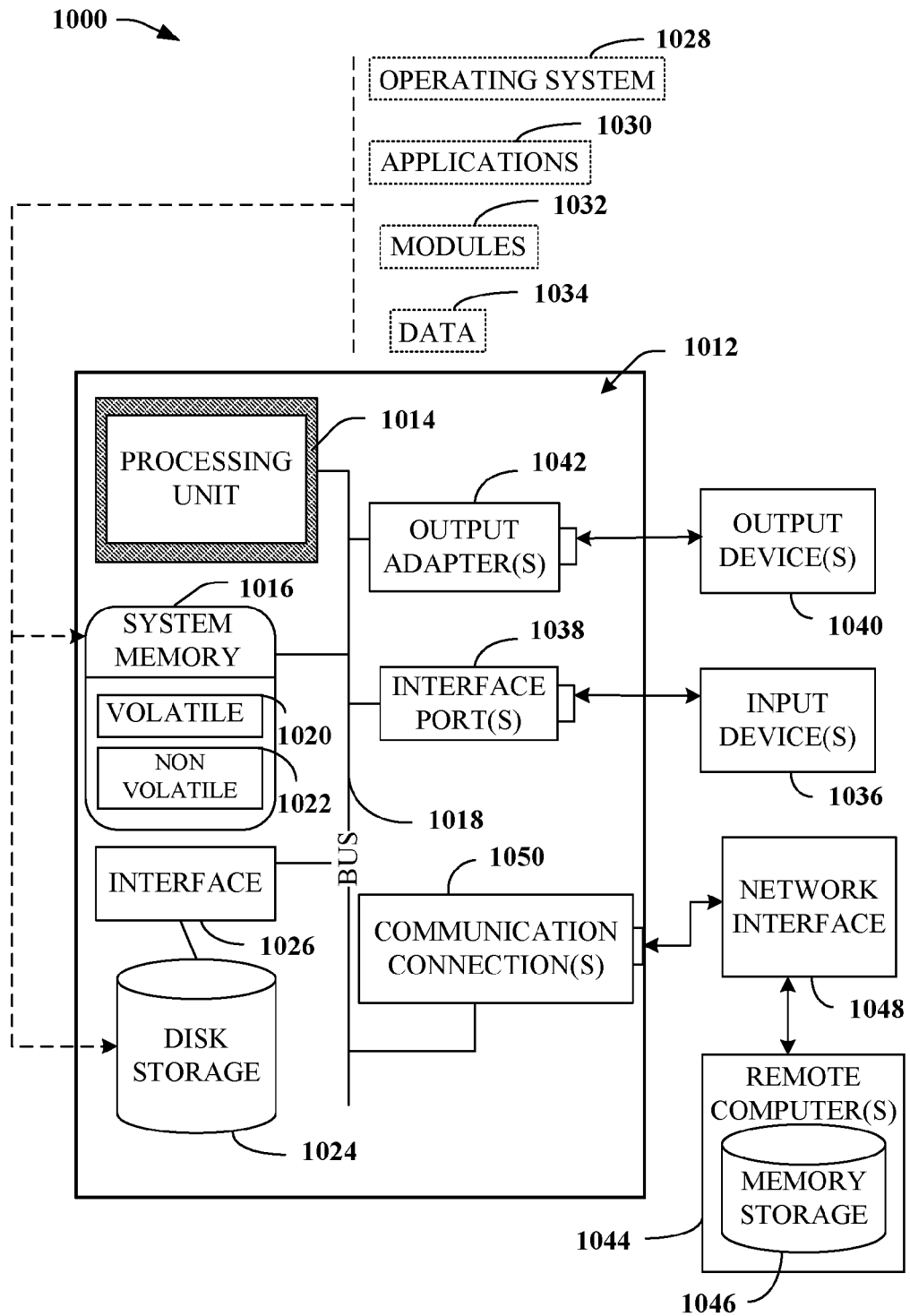
FIG. 10 illustrates a block diagram representing an illustrative non-limiting computing system or operating environment in which one or more aspects of various embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed components, systems, devices, methods, processes, etc., e.g., file system 102, data recovery search service 120, etc. is illustrated, in accordance with an embodiment. Computer 1012 includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), Small Computer Systems Interface (SCSI), and/or controller area network (CAN) bus used in vehicles.

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media, networked attached storage (NAS), e.g., SAN storage, etc. FIG. 10 illustrates, for example, disk storage 1024. Disk storage 1024 includes, but is not limited to, devices like a magnetic disk drive, floppy disk drive, tape drive, Jaz drive, Zip drive, LS-110 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 include, for example, a serial port, a parallel port, a game port, a universal serial bus (USB), a wireless based port, e.g., WiFi, Bluetooth®, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 include, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least WiFi and Bluetooth® wireless technologies. Thus, the communication can be a predefined structure as with a conventional network or simply an ad hoc communication between at least two devices.

WiFi allows connection to the Internet from a desired location (e.g., a vehicle, couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A file system, comprising:
   a processor; and
   a memory that stores executable instructions that, when executed by the processor, facilitate performance of operations, comprising:
      in response to receiving, from a callback function that has been registered with a file system notification component, an event notification representing a file system error, determining, based on at least one checksum error being determined to satisfy a defined criterion for bit-rot, that a portion of a file or a virtual block device has been at least one of corrupted or invalidated due to bit-rot;
      in response to the determining that the portion has been corrupted or invalidated due to bit-rot, obtaining checksum information and location information for the portion, wherein the checksum information comprises a checksum of an uncorrupted version of the portion, and wherein the location information comprises an offset from a beginning of the file or the virtual block device representing a location of the portion, a block size of the portion, and a file location of the file or a path location of the virtual block device;
      sending a request, comprising the checksum information and the location information directed to a data recovery search service, to obtain a copy of the uncorrupted version of the portion from the data recovery search service;
      receiving the copy of the uncorrupted version of the portion from the data recovery search service, wherein the data recovery search service obtained, based on the checksum information and the location information, the copy of the uncorrupted version of the portion from one or more backup storage devices that have stored respective copies of the file or the virtual block device; and
      repairing, using the copy of the uncorrupted version of the portion, the portion that has been corrupted or invalidated due to bit-rot.

2. The file system of claim 1, wherein the receiving comprises at least one of:
   registering the callback function with the file system to receive the event notifications representing the respective file system errors, wherein the callback function corresponds to a system call that has been executed via an application programming interface of the file system; or
   in response to monitoring a log of the file system for a checksum error, producing the event notification.

3. The file system of claim 1, wherein the obtaining the checksum information comprises:
   determining, using an application programming interface call, at least one of the checksum or information representing a checksum process that was used to generate the checksum.

4. The file system of claim 1, wherein the location information comprises:
   a file name of the file, a file length of the file, and a file system identifier of the file system.

5. The file system of claim 1, wherein the sending comprises:
   based on security information, authorizing the sending of the request.

6. The file system of claim 5, wherein the security information comprises at least one of a host identification of the file system or user information representing an identity of a user that has been authorized to access the file system.

7. The file system of claim 1, wherein the repairing comprises:
   writing, using a system call, the copy to the portion.

8. The file system of claim 1, wherein the repairing comprises:
   writing, using a block device operation performed on a disk block of the file system, the copy to the portion.

9. The file system of claim 1, wherein the repairing comprises:
   determining, based on a checksum process that was used to generate the checksum, a determined checksum of the copy; and
   in response to determining that the determined checksum matches the checksum, repairing the portion.

10. The file system of claim 1, wherein the checksum corresponds to at least one of a hash algorithm, a message digest algorithm, a secure hash algorithm (SHA), or a message-digest algorithm 5 (MD5) algorithm.

11. The file system of claim 1, wherein the one or more backup storage devices comprise at least one of a remote replication of the file system, a backup disk of the file system, a virtual tape library (VTL) of the file system, a backup tape device of the file system, or a cloud backup service of the file system.

12. The file system of claim 1, wherein the one or more data blocks have been stored in at least one of a just a bunch of disks (JBOD) storage device of the file system, a redundant array of inexpensive disks (RAID) bunch of disks (RBOD) storage device of the file system, or a virtual storage appliance of the file system.

13. A method, comprising:
   receiving, by a system comprising a processor via a callback function that has been registered with a file system notification component for generation of an error event notification representing a file system error, the error event notification;

in response to determining, based on a checksum error corresponding to the error event notification, that a portion of a file or a virtual block device has been at least one of invalidated or corrupted, obtaining, by the system, checksum information comprising a checksum of a validated version of the portion and location information comprising an offset from a beginning of the file or the virtual block device representing a location of the portion, a block size of the portion, and a file location of the file or a path location of the virtual block device;

sending, by the system, the checksum information and the location information directed to a server hosting a data recovery search service to obtain a copy of the validated version of the portion, the data recovery search service being configured to obtain, based on the checksum information and the location information, the copy of the validated version of the portion from at least one backup storage device that has stored a copy of the file or the virtual block device; and in response to receiving the copy of the validated version of the portion from the data recovery search service, repairing, by the system using the copy of the validated version of the portion, the portion that has been invalidated or corrupted.

14. The method of claim 13, wherein the receiving comprises at least one of:

registering a callback function with the system for generating the error event notifications; or in response to monitoring an event log of the system for checksum errors, generating the error event notification.

15. The method of claim 14, wherein the repairing comprises:

writing, using a block device operation performed on a disk block of the system, the copy of the validated version to the portion that has been invalidated or corrupted.

16. The method of claim 13, wherein the obtaining the checksum information comprises:

determining, using an application programming interface function call, at least one of the checksum, the file location, the path location, or information representing checksum acts corresponding to the checksum.

17. The method of claim 13, wherein the sending comprises:

in response to determining, based on security information, that the sending has been authorized, sending the checksum information and the location information directed to the data recovery search service.

18. The method of claim 13, wherein the repairing comprises:

writing, via a system call, the copy of the validated version to the portion that has been invalidated or corrupted.

19. A system, comprising:
a processor; and
a memory that stores executable instructions that, when executed by the processor, facilitate performance of operations, comprising:

receiving, by a data recovery search service from a data recovery agent device, a query for obtaining a copy of an uncorrupted portion of a file or a virtual block device, wherein the query comprises checksum information comprising a checksum of the uncorrupted portion and location information comprising an offset from a beginning of the file or the virtual block device representing a location of the uncorrupted portion, a block size of the uncorrupted portion, and a file location of the file or a path location of the virtual block device, wherein the query corresponds to a callback function that has been registered with a file system notification component of the data recovery agent device for identification of file system errors corresponding to the file or the virtual block device;

using at least one component of a group of software plug-in components that have been registered with the data recovery search service for communicating with respective backup storage devices, obtaining, based on the checksum information and the location information, a copy of the uncorrupted portion from a backup storage device of the respective backup storage devices; and sending the copy of the uncorrupted portion directed to the data recovery agent device in satisfaction of the query.

20. The system of claim 19, wherein the obtaining the copy comprises:

retrieving a file copy of the file from the backup storage device; and extracting the copy of the uncorrupted portion from a portion of the file copy.

21. The system of claim 19, wherein the obtaining the copy comprises:

retrieving a portion of the file or the virtual block device from at least one of a remote-replica of a file system or a cloud backup of the file system, wherein the file system comprises the file or the virtual block device; and extracting the copy of the uncorrupted portion from the portion.

22. The system of claim 19, wherein the sending the copy comprises:

determining a computed checksum on the copy of the uncorrupted portion; and in response to verifying that the computed checksum matches the checksum, sending the copy of the uncorrupted portion directed to the data recovery agent device.

23. The system of claim 19, wherein the obtaining the copy comprises:

receiving authorization information for accessing the backup storage device; and based on the authorization information, obtaining the copy of the uncorrupted portion from the backup storage device, wherein the authorization information comprises at least one of an Internet protocol address of the backup storage device, a username identity corresponding to the backup storage device, or a password corresponding to the username identity.

24. A non-transitory machine-readable storage medium, comprising executable instructions that, when executed by a processor, facilitate performance of operations, comprising:

in response to receiving, from a data recovery system via a callback function that has been registered with the data recovery system for identification of file system errors corresponding to a file or a virtual block device, a request to obtain a copy of an uncorrupted portion of the file or the virtual block device, obtaining, via software plug-ins corresponding to respective backup storage devices, the copy from a backup storage device of the respective backup storage devices, wherein the request comprises a checksum of the uncorrupted portion of the file or the virtual block device and location information comprising an offset from a beginning of the file or the virtual block device representing a location of the uncorrupted portion, a block size of the uncorrupted portion, and a file location of the file or a path location of the virtual block device; and sending the copy directed to the data recovery system.

25. The non-transitory machine-readable storage medium of claim 24, wherein the obtaining comprises:

iteratively sending, via the software plug-ins, respective queries comprising at least the checksum or the location information directed to the respective backup storage devices; and based on a query of the respective queries, receiving the copy from the backup storage device.

* * * * *